(12) United States Patent
Mustiere et al.

(10) Patent No.: US 10,614,788 B2
(45) Date of Patent: Apr. 7, 2020

(54) TWO CHANNEL HEADSET-BASED OWN VOICE ENHANCEMENT

(71) Applicant: SYNAPTICS INCORPORATED, San Jose, CA (US)

(72) Inventors: Frederic Philippe Denis Mustiere, Irvine, CA (US); Francesco Nesta, Aliso Viejo, CA (US); Trausti Thormundsson, Irvine, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/922,848

(22) Filed: Mar. 15, 2018

(65) Prior Publication Data

US 2018/0268798 A1 Sep. 20, 2018

Related U.S. Application Data

(60) Provisional application No. 62/471,856, filed on Mar. 15, 2017.

(51) Int. Cl.
*A61F 11/06* (2006.01)
*G10K 11/16* (2006.01)
(Continued)

(52) U.S. Cl.
CPC .......... *G10K 11/16* (2013.01); *G10K 11/1785* (2018.01); *G10K 11/17885* (2018.01);
(Continued)

(58) Field of Classification Search
CPC ........................... G10K 11/16; G10K 11/17885
(Continued)

(56) References Cited

U.S. PATENT DOCUMENTS 5,806,025 A * 9/1998 Vis ...................... G10L 21/0208
381/94.3
5,937,070 A * 8/1999 Todter .................. G10K 11/178
381/71.6
(Continued)

OTHER PUBLICATIONS

Subramanya, Amarnag, et al., "Multisensory processing for speech enhancement and magnitude-normalized spectra for speech modeling", Speech Communication, vol. 50, pp. 228-243, 2008.
(Continued)

*Primary Examiner* — William J Deane, Jr.
(74) *Attorney, Agent, or Firm* — Haynes and Boone, LLP

(57) ABSTRACT

Systems and methods for enhancing a headset user's own voice include an outside microphone, an inside microphone, audio input components operable to receive a plurality of time-domain microphone signals, including an outside microphone signal from the outside microphone and an inside microphone signal from the inside microphone, a subband decomposition module operable to transform the time-domain microphone signals to frequency domain subband signals, a voice activity detector operable to detect speech presence and absence in the subband signals, a speech extraction module operable to predict a clean speech signal in each of the inside microphone signal and the outside microphone signal, and cancel audio sources other than a headset user's own voice by combining the predicted clean speech signal from the inside microphone signal and the predicted clean speech signal from the outside microphone signal, and a postfiltering module operable to reduce residual noise.

20 Claims, 8 Drawing Sheets

(51) Int. Cl.
| | |
|---|---|
| *H04R 1/08* | (2006.01) |
| *H04R 3/04* | (2006.01) |
| *G10K 11/178* | (2006.01) |
| *H04R 1/10* | (2006.01) |
| *G10L 21/0232* | (2013.01) |
| *H04R 3/00* | (2006.01) |
| *H04M 1/60* | (2006.01) |
| *G10L 25/78* | (2013.01) |
| *G10L 21/0216* | (2013.01) |

(52) U.S. Cl.
CPC ............ *G10L 21/0232* (2013.01); *H04R 1/08* (2013.01); *H04R 1/1083* (2013.01); *H04R 3/005* (2013.01); *H04R 3/04* (2013.01); *G10K 2210/1081* (2013.01); *G10K 2210/3025* (2013.01); *G10K 2210/3028* (2013.01); *G10K 2210/3035* (2013.01); *G10K 2210/3056* (2013.01); *G10L 25/78* (2013.01); *G10L 2021/02165* (2013.01); *H04M 1/6058* (2013.01); *H04R 2201/107* (2013.01); *H04R 2410/05* (2013.01); *H04R 2430/03* (2013.01)

(58) Field of Classification Search
USPC .................................. 381/71.12, 71.14, 94.1
See application file for complete search history.

(56) References Cited

U.S. PATENT DOCUMENTS

| | | | | |
|---|---|---|---|---|
| 6,661,901 | B1* | 12/2003 | Svean | H04R 1/1083 381/317 |
| 7,246,058 | B2 | 7/2007 | Burnett | |
| 7,359,520 | B2* | 4/2008 | Brennan | H04R 3/005 381/122 |
| 7,499,686 | B2 | 3/2009 | Sinclair et al. | |
| 8,630,433 | B2* | 1/2014 | Guth | H04R 3/02 381/317 |
| 8,712,078 | B2* | 4/2014 | Abolfathi | H04R 25/606 381/151 |
| 8,966,067 | B2* | 2/2015 | Lukas | G06F 11/3495 709/224 |
| 9,498,626 | B2* | 11/2016 | Fruhauf | A61N 1/3606 |
| 2006/0206320 | A1* | 9/2006 | Li | G10L 21/0208 704/226 |
| 2008/0208031 | A1* | 8/2008 | Kurpad | A61B 5/06 600/410 |
| 2011/0249849 | A1* | 10/2011 | Guth | H04R 1/1016 381/328 |
| 2014/0126732 | A1* | 5/2014 | West | H04R 1/46 381/67 |
| 2015/0163604 | A1* | 6/2015 | Fruhauf | A61N 1/3606 607/57 |
| 2015/0261429 | A1* | 9/2015 | Ghassabian | G06F 3/0482 715/773 |
| 2015/0304782 | A1* | 10/2015 | Zurbrugg | H04R 25/407 381/328 |
| 2016/0255452 | A1* | 9/2016 | Nowak | G10L 19/008 381/17 |
| 2017/0206908 | A1* | 7/2017 | Nesta | G10L 21/0232 |
| 2017/0213550 | A1* | 7/2017 | Ali | G10L 15/20 |
| 2018/0090158 | A1* | 3/2018 | Jensen | G10L 25/21 |
| 2018/0184203 | A1* | 6/2018 | Piechowiak | H04R 5/033 |

OTHER PUBLICATIONS

Li, Mingzi, et al., "Multisensory Speech Enhancement in Noisy Environments Using Bone-Conducted and Air-Conducted Microphones", Israel Institute of Technology, pp. 1-5, 2013.

Li, Mingzi, et al., "Multisensory Speech Enhancement in Noisy Environments Using Bone-Conducted and Air-Conducted Microphones", Final Paper, Israel Institute of Technology, pp. 1-91, Nov. 2013.

Tamiya, T. et al., "Reconstruction Filter Design for Bone-Conducted Speech", Dept. of Information and Computer Sciences, Saitama University, 2005.

Zheng, Yanli et al., "Air- and Bone-Conductive Integrated Microphones for Robust Speech Detection and Enhancement", 2003 IEEE Workshop on Automatic Speech Recognition and Understanding, pp. 249-254, 2003.

Rahman, Shahidur M. et al., "A Study on Amplitude Variation of Bone Conducted Speech Compared to Air Conducted Speech", 2013 Asia-Pacific Signal and Information Processing Associated Annual Summit and Conference, 5 pages, 2013.

Zhang, Zhengyou et al., "Multi-Sensory Microphones for Robust Speech Detection, Enhancement and Recognition", 2004 IEEE International Conference on Acoustics, Speech, and Signal Processing, 4 pages, 2004.

Rahman, Shahidur M. et al., "Pitch Characteristics of Bone Conducted Speech", 18$^{th}$ European Signal Processing Conference, pp. 795-799, 2010.

Li et al., "Multisensory Speech Enhancement in Noisy Environments Using Bone-Conducted and Air-Conducted Microphones", 2013, pp. 1-5, Israel Institute of Technology.

Li et al., "Multisensory Speech Enhancement in Noisy Environments Using Bone-Conducted and Air-Conducted Microphones", Final Paper, Nov. 2013, pp. 1-91, Israel Institute of Technology.

Rahman et al., "Pitch Characteristics of Bone Conducted Speech", Aug. 23-17, 2010, pp. 795-799, 18th European Signal Processing Conference (EUSIPCO-2010), Aalborg, Denmark.

Rahman et al., "A Study on Amplitude Variation of Bone Conducted Speech Compared to Air Conducted Speech", Oct. 2013, pp. 1-5, Signal and Information Processing Association Annual Summit and Conference (APSIPA), 2013 Asia-Pacific.

Rahman et al., "Low-Frequency Band Noise Suppression Using Bone Conducted Speech", Aug. 2011, pp. 520-525, Proceedings of 2011 IEEE Pacific Rim Conference on Communications, Computers and Signal Processing.

Subramanya et al., "Multisensory processing for speech enhancement and magnitude-normalized spectra for speech modeling", accepted Sep. 10, 2007 in Speech Communication, Published in 2008, vol. 50, pp. 228-243, Available online at www.sciencedirect.com.

Tamiya et al., "Reconstruction Filter Design for Bone-Conducted Speech", Sep. 2005, pp. 1-5, Department of Information and Computer Sciences, Saitama University, Japan.

Zhang et al., "Multi-Sensory Microphones for Robust Speech Detection, Enhancement and Recognition", Jun. 2004, vol. 3, pp. 1-4, Acoustics, Speech, and Signal Processing, 2004. Proceedings. (ICASSP '04). IEEE International Conference.

Zheng et al., "Air- and Bone-Conductive Integrated Microphones for Robust Speech Detection and Enhancement", Dec. 2003, pp. 249-254, Published in 2003 IEEE Workshop on Automatic Speech Recognition and Understanding (IEEE Cat. No. 03EX721).

Zhu et al, "A Robust Speech Enhancement Scheme on the Basis of Bone-conductive Microphones", Oct. 2007, pp. 353-355, Signal Design and Its Applications in Communications, 2007. IWSDA 2007. 3rd International Workshop.

\* cited by examiner

TWO CHANNEL HEADSET-BASED OWN VOICE ENHANCEMENT

CROSS-REFERENCE TO RELATED APPLICATIONS

This application claims the benefit of and priority to U.S. Provisional Patent Application No. 62/471,856 filed Mar. 15, 2017 and entitled "TWO CHANNEL HEADSET-BASED OWN VOICE ENHANCEMENT," which is incorporated herein by reference in its entirety.

TECHNICAL FIELD

The present disclosure relates generally to audio signal processing, and more particularly for example, to systems and methods for processing a user's own voice.

BACKGROUND

Many headsets include one or more speakers for listening to audio and one or more microphones for picking up the user's own voice. For example, a smartphone user wearing a headset may desire to participate in a phone conversation. In another application, a user may desire to use the headset to provide voice commands to a connected device. Today's headsets are generally reliable in noise-free environments. However, in noisy situations the performance of applications such as automatic speech recognizers can degrade significantly. In such cases users may need to significantly raise their voice (with the undesirable effect of attracting attention to themselves), with no guarantee of optimal performance. Similarly, the listening experience of a far-end conversational partner is also undesirably impacted by the presence of background noise.

In view of the foregoing, there is a continued need for improved systems and methods for providing efficient and effective voice processing and noise cancellation in headsets.

SUMMARY

In accordance with the present disclosure, systems and methods for enhancing a user's own voice in a headset are disclosed. In various embodiments, a method for enhancing a headset user's own voice comprises receiving a plurality of time-domain microphone signals from the headset, including an outside microphone signal from an external microphone configured to sense audio signals outside of the headset, and an inside microphone signal from an inside microphone configured to sense signals on the inside of the headset (e.g., positioned inside the headset user's ear canal during operation), transforming the time-domain microphone signals to frequency domain subband signals, detecting speech presence and absence in the subband signals, predicting a clean speech signal in each of the inside microphone signal and outside microphone signal through an adaptive multichannel linear filter estimation process, cancelling audio sources other than the headset user's own voice by combining the predicted clean speech signal from the inside microphone signal and the predicted clean speech signal from the outside microphone signal, and reducing residual noise through a postfiltering process.

In some embodiments, the method further comprises limiting distortion introduced in the cancelling and reducing steps, transforming the subband signals into time domain output signals through a subband synthesis process, reducing body-sound-induced transient noise from the time domain output signals. In some embodiments, the method further comprises cancelling audio sources further comprises linearly combining lower frequency bands of the predicted clean speech signal from the inside microphone signal with higher frequency bands of the predicted clean speech signal from the outside speech signal, wherein linearly combining further comprises updating weights of the linearly combined speech signals during detected speech absences, and wherein the weights of the linearly combined speech signals are calculated to model a relative transfer function of noise signal contributions between the inside and outside microphones.

In some embodiments, the method further comprises reducing wind noise by replacing lower frequency bands of the estimated inside microphone clean speech with lower frequency bands of the received inside microphone signal, and reducing wind noise by reducing lower frequency bands of the predicted clean speech signal from the inside microphone signal. In some embodiments, reducing the lower frequency bands of the predicted clean speech signal from the inside microphone signal is performed only when a measured power of the predicted clean speech signal from the inside microphone signal is significantly larger than a measured power of the received inside microphone signal.

In various embodiments, a system includes a headset having an outside microphone, an inside microphone, audio input components operable to receive a plurality of time-domain microphone signals, including an outside microphone signal from the outside microphone and an inside microphone signal from the inside microphone, a subband decomposition module configured to transform the time-domain microphone signals to frequency domain subband signals, a voice activity detector operable to detect speech presence and absence in the subband signals, a speech extraction module operable to predict a clean speech signal in each of the inside microphone signal and the outside microphone signal, and cancel audio sources other than a headset user's own voice by combining the predicted clean speech signal from the inside microphone signal and the predicted clean speech signal from the outside microphone signal, and a postfiltering module operable to reduce residual noise.

In some embodiments, the system further comprises a time-domain synthesis module operable to transform the subband signals into time domain output signals through a subband synthesis process, and a transient noise reduction module operable to reduce body-sound-induced transient noise from the time-domain output signals. In some embodiments, the speech extraction module is further operable to linearly combine lower frequency bands of the predicted clean speech signal from the inside microphone signal with higher frequency bands of the predicted clean speech signal from the outside speech signal, update weights of linearly combined speech signals during detected speech absences, and calculate weights of linearly combined speech signals to model a relative transfer function of noise signal contributions between the inside microphone and the outside microphone.

In some embodiments, the system further comprises a wind noise reduction module operable to replace lower frequency bands of the predicted clean speech signal from the inside microphone with lower frequency bands of the predicted clean speech signal from the received inside microphone signal.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1:
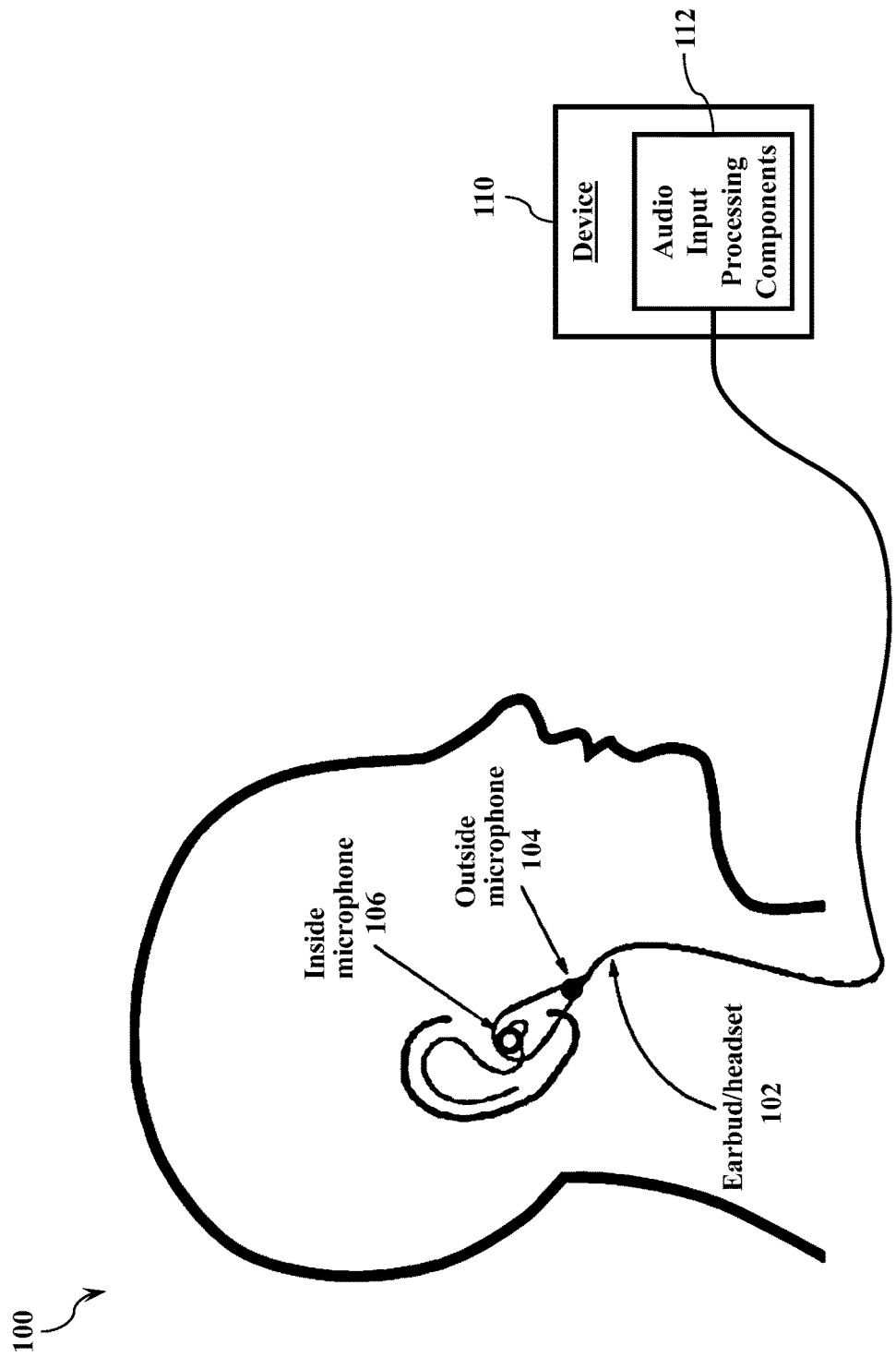
FIG. 1 illustrates a headset use environment, in accordance with one or more embodiments of the present disclosure.

In accordance with various embodiments of the present disclosure, systems and methods for enhancing a user's own voice in a two-channel headset are disclosed.

Many headsets include an outside microphone operable to sense external audio signals and an inside microphone (e.g., positioned within the user's ear canal) operable to receive a signal that includes the sum of a bone-conducted speech signal including low frequencies boosted from the occlusion effect and some leakage noise from the outside of the headset. In a sub-area of speech enhancement that some researchers call "Multi-sensory speech enhancement" (discussed further below) both a bone conduction (BC) microphone and an air conduction (AC) microphone have been used for noise reduction. However, these conventional approaches have many drawbacks for use in modern applications which are overcome by the present disclosure.

In "Multisensory processing for speech enhancement and magnitude-normalized spectra for speech modeling", by Subramanya et al, Speech Communication 50 (2008) 228-243, a solution based on Dynamic Bayesian Networks (DBN) inference is proposed. As disclosed, clean speech at the AC microphone is modeled as a Mixture of Gaussians in a magnitude-normalized spectral domain. This model is pre-trained with clean speech, and then the full posterior of the magnitude-normalized clean speech is calculated using this knowledge. This solution has many drawbacks. For example, the solution requires training on clean speech data which limits robustness to general conditions. The solution is also computationally complex and the results are not acceptable for many low-SNR, real world applications.

In "A robust speech enhancement scheme on the basis of bone-conductive microphones," by Zhu et al, Signal Design and Its Applications in Communications, 2007, a solution is proposed using the BC microphone signal to guide a single-channel Voice Activity Detector (VAD), which is then used to determine when to estimate the noise spectrum in the AC microphone and which is subsequently utilized in a single-channel speech enhancement algorithm. Using this approach, the expected performance at low signal-to-noise-ratios (SNRs) remains limited by the single-channel enhancer.

In "Low-frequency band noise suppression using bone conducted speech," by Rahman et al, in Communications, Computers and Signal Processing (PacRim), 2011, an approach is disclosed that includes combining the low frequencies of the BC microphone signal and the high frequencies of the AC microphone signal. However, the disclosed system does not filter out any of the noise remaining in the pasted parts of the AC and BC signals.

In "A reconstruction filter for bone-conducted speech," by T. Shimamura, Circuits and Systems, 2005, an approach is disclosed that includes performing a fixed equalization of the BC microphone signal, determined a priori from long-term measurements of AC/BC transfer function ratio. The approach does not include filtering leakage noise.

In "Multisensor dynamic waveform fusion", McCree et all, ICASSP 2007, an approach is disclosed that includes using a multichannel Wiener filter to achieve AC/BC enhancement. The disclosed solution, however, requires extensive prior calibration, is sensitive to the accuracy of the online estimation of the clean speech power, and may be subject to annoying musical artifacts.

In "Multi-sensory microphones for robust speech detection, enhancement, and recognition", Zhang et al, ICASSP 2004, a cepstral-domain mapping from the BC clean speech to the AC clean speech is pre-trained/learned and used to form a single-channel Wiener filter applied to the noisy AC signal. This solution requires pre-training, and the BC microphone signal cannot be assumed to be noise-free in many applications.

In U.S. Pat. No. 7,246,058, titled "Detecting voiced and unvoiced Speech using both acoustic and nonacoustic sensors," a "Non-Acoustic Sensor" is used strictly for Voice Activity Detection to drive a conventional two-channel adaptive noise cancellation stage, which comprises a speech-dominant microphone and a noise-dominant microphone.

These and other drawbacks of conventional approaches are addressed through various embodiments of the present disclosure. Referring to FIG. 1, an embodiment of a use case of the present disclosure will be described. In various environments and applications, a user 100 wearing a headset, such as earbud headset 102 (or other "hearable" device), may desire to control a device 110 (e.g., a smart phone) via voice-control or otherwise deliver voice communications, such as through a phone conversation, in a noisy environment. In many noise-free environments, Automatic Speech Recognizers (ASRs) may be sufficiently accurate to allow for a reliable and convenient typing-free user experience, such as by voice commands received through outside microphone 104. In noisy situations, however, the performance of ASRs can degrade significantly. In such cases the user 100 may compensate by significantly raising his/her voice, with no guarantee of optimal performance. Similarly, the listening experience of far-end conversational partners is also largely impacted by the presence of background noise.

In the present disclosure, robust and computationally efficient noise removal systems and methods are disclosed based on the utilization of microphones both on the outside of the headset, such as outside microphone 104, and inside the headset or ear canal, such as inside microphone 106. In various embodiments, the user 100 may discreetly send voice communications or voice commands to the device 110, even in very noisy situations. The systems and methods disclosed herein improve voice processing applications such as speech recognition and the quality of voice communications with far-end users. In various embodiments, the inside microphone 106 is an integral part of the 2-channel noise cancellation system, and audio input processing components 112 take advantage of information received by both the inside microphone 106 and outside microphone 104. In various embodiments, the audio input processing components 112 may be disposed within the earbud/headset 102, the device 110 (as illustrated) or in one or more other devices or components.

Figure 2:
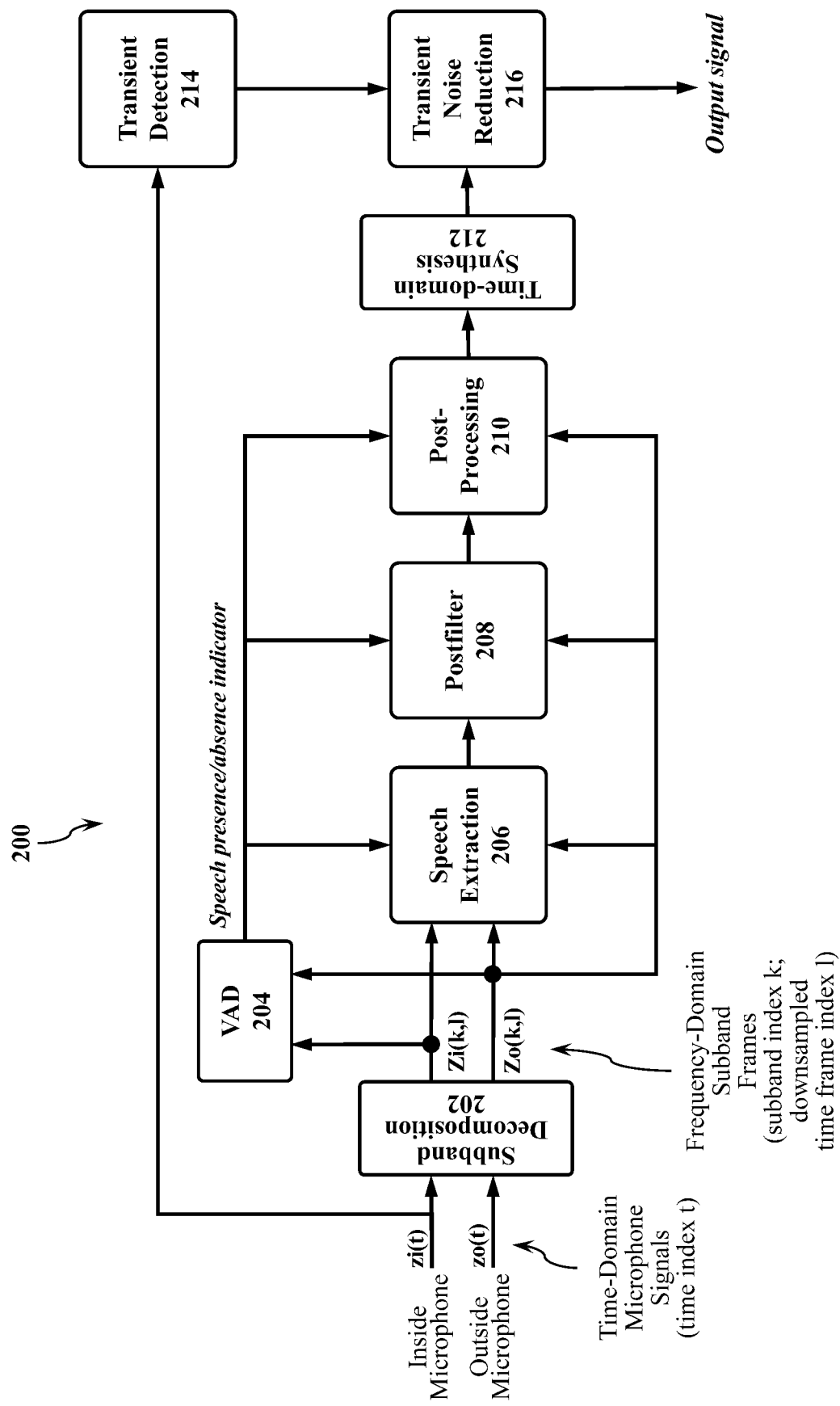
FIG. 2 is a diagram of an audio input processing system, in accordance with one or more embodiments of the present disclosure.

Referring to FIG. 2, an audio input processing system 200 in accordance with one or more embodiments of the present disclosure will now be described. In the illustrated embodiment, the inside microphone is used as an acoustic sensor, even though the speech components it receives are a distorted version of the speech components received at the outside microphone. For example, due to imperfect occlusion the inside microphone may contain a filtered version of the outside microphone noise. In this embodiment, the Relative Transfer Function (RTF) of the noise between the outside microphone and the inside microphone is of a relatively small magnitude (relative to the speech RTF) and is sufficiently stationary.

In view of the foregoing, both the inside microphone signal, zi(t), and the outside microphone signal, zo(t), are used for subband multichannel linear filtering. In one embodiment, both microphone signals are used in a first stage to determine speech signal presence. Using this information, a noise-cancelling filter is determined based on both the inside microphone signal and the outside microphone signal that produces a speech signal approximating the inside speech component (e.g., in some embodiments it may be distorted but clean). The resulting signal may be more intelligible (and lend itself to better ASR) than either of the unprocessed signals received from the inside microphone and the outside microphone.

At a second stage, a sound output is produced, for example through equalization, post-processing and post-filtering, which may depend on the SNR at the outside microphone. In one embodiment, the post-processing contains a click-reduction algorithm to reduce pops and clicks picked up at the inside microphone due to body noises such as the Eustachian tube equalizing the pressure on each side of the eardrum. In some embodiments, more than 2 microphones are available, which allows for additional noise-rejecting preprocessing.

Voice Activity Detection

Referring to FIG. 2, the audio input processing system 200 includes a subband decomposition module 202 used for transforming the incoming digitized time-domain signals into frequency domain subband frames, a Voice-Activity-Detector (VAD) 204, a speech extraction module 206, a postfilter module 208, a postprocessing module 210, a time-domain synthesis module 212, a transient noise detection module 214 and a transient noise reduction module 216.

As illustrated, the VAD 204 is configured to detect "non-speech" frames in the frequency domain subband frames of the microphone signals. In one embodiment, the VAD 204 tracks the signal power of the signal received from each of the two microphones and determines a ratio between the inside microphone signal power and outside microphone signal power. When there is no speech from the user of the system, the signal power at the outside microphone is typically larger than the signal power at the inside microphone, which can be detected by setting a threshold on the ratio of powers.

Figure 3:
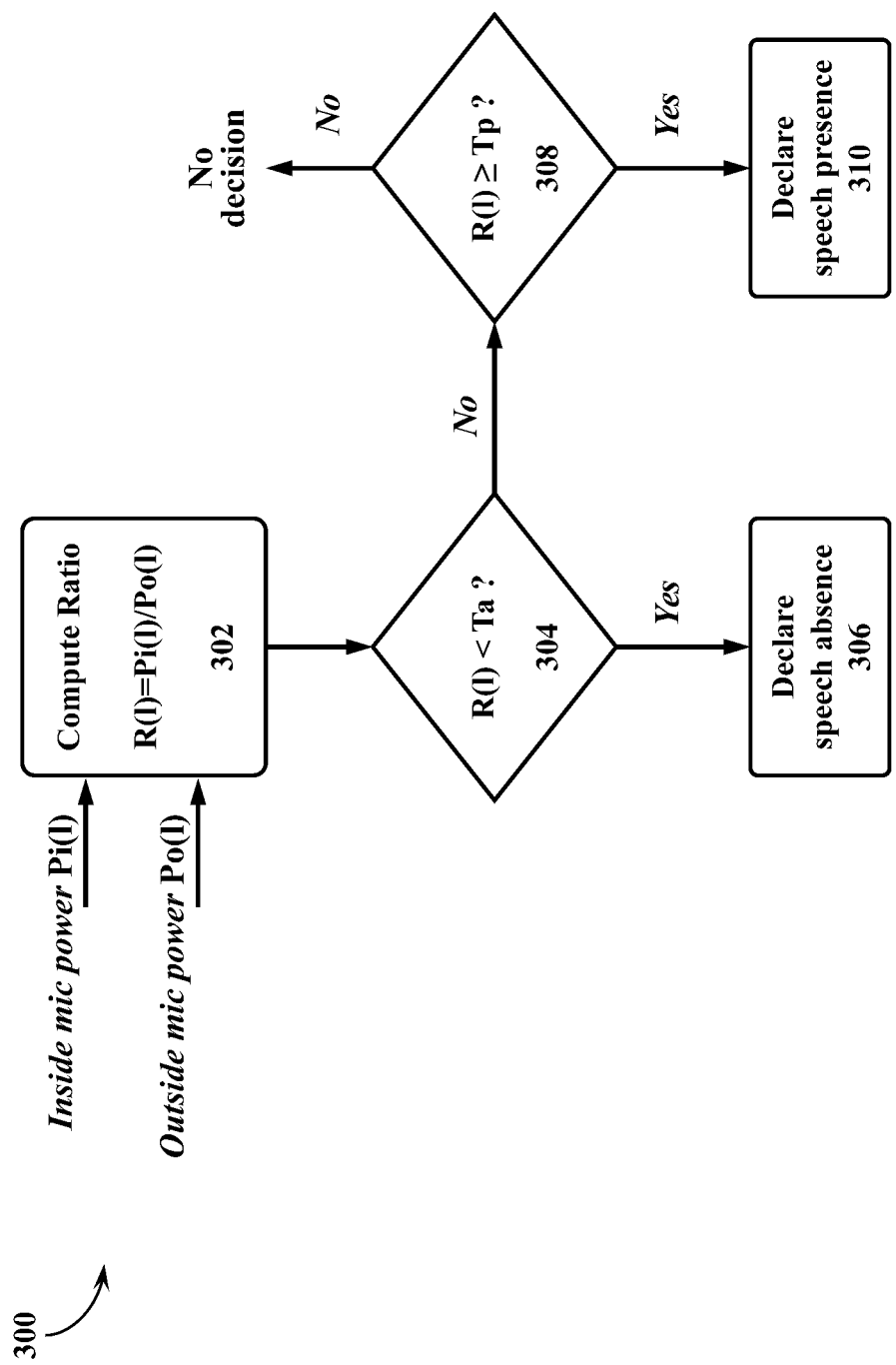
FIG. 3 illustrates an exemplary operation of a voice activity detector, in accordance with one or more embodiments of the present disclosure.

An embodiment of the operation of the VAD 204 is illustrated in FIG. 3, which will now be described. A method of operation 300 includes receiving an inside microphone signal power and an outside microphone signal power and detecting the presence or absence of the user's own speech. In step 302, the ratio of the inside microphone signal power and the outside microphone signal power is computed. Denote by $P_{i,inst}(l)=\Sigma_k|Z_i(k,l)|^2$ the instantaneous power at the inside microphone, and $P_{o,inst}(l)=\Sigma_k|Z_o(k,l)|^2$ the instantaneous power at the outside microphone. The instantaneous power quantities can be calculated over any preferred number of subbands (i.e., the summation index k can cover any preferred set). In one embodiment, k covers the frequency ranges 500-1500 Hz. Next, let $P_i(l)$ and $P_o(l)$ be the "tracked" powers at the inside microphone and outside microphone, respectively. The tracking/smoothing of powers can, for example, be achieved via one-pole averaging of instantaneous powers. In one embodiment, the following rules are used to detect speech presence/absence, where $T_a$ and $T_p$ are absence and presence thresholds, respectively, which can be predetermined or adaptive in various embodiments:

$$\text{If } R(l) = \frac{P_i(l)}{P_o(l)} < T_a, \text{ declare speech absence}$$

$$\text{If } R(l) = \frac{P_i(l)}{P_o(l)} \geq T_p, \text{ declare speech presence}$$

In step 304, if the ratio R(l) is less than the absence threshold, $T_a$, then the absence of the user's own speech is declared (step 306). Otherwise, in step 308, if the ratio R(l) is greater than or equal to the presence threshold, $T_p$, then the presence of the user's own speech is declared in (step 310). Otherwise, no decision on the absence or presence of the user's own speech is made.

In various embodiments, other types of VADs could be used, consistent with the present disclosure. For example, R could be calculated as the minimum eigenvalue of the covariance matrix between the inside microphone signal and the outside microphone signal. In another embodiment, a single-channel VAD may be used on the inside microphone signal only. Combinations of two or more VADs may also be used.

Separation of Speech and Noise

For simplicity of notation, in the next model equations dependence on the subband index "k" and frame "l" are removed. Therefore, all the derivations refer to a single subband but the disclosure is meant to be applied to each subband independently.

In one embodiment, the separation of speech and noise (e.g., speech extraction module 206, FIG. 2) uses the following:

$$Z_i = H_s X_o + H_n N_o$$

$$Z_o = X_o + N_o$$

where $X_o$ is the outside clean speech component, $H_s X_o = X_i$ is the inside clean speech component, $H_s$ is the speech RTF, $N_o$ is the outside noise component, $H_n N_o = N_i$ is the inside noise component, and $H_n$ is the noise relative transfer function.

In this embodiment, the inside microphone signal is treated as an acoustic source. We begin by estimating the inside microphone signal $X_i$ via:

$$\begin{aligned} X_1 &= Z_i - H_n Z_o \\ &= (H_s - H_n) X_o \\ &= \left(1 - \frac{H_n}{H_s}\right) X_i \\ &\approx X_i \end{aligned}$$

To see better why the approximation is valid, consider first the triangle inequality, which dictates that:

$$1 - \left|\frac{H_n}{H_s}\right| \leq \left|1 - \frac{H_n}{H_s}\right| \leq 1 + \left|\frac{H_n}{H_s}\right|$$

In various embodiments, it is observed that the physical constraints of the problem at hand imposes that $$\left|\frac{H_n}{H_s}\right| \ll 1$$

—particularly at lower frequencies. This follows from the fact that a typical earbud/headset blocks a relatively large amount of noise ($|H_n| \ll 1$), and at lower frequencies the occlusion effects may boost the speech signal such that $|H_s| \geq 1$. A similar explanation would also apply to the phase distortion. Therefore, estimating only the noise RTF $H_n$ is sufficient to give an approximation of $X_i$.

Estimating the noise relative transfer function, $H_n$, during speech pauses (as indicated by the VAD 204) may be performed by a conventional system identification method, and the update does not need to be fast in the illustrated embodiment or other physical situations where $H_n$ is found to be slowly time-varying.

Figure 4:
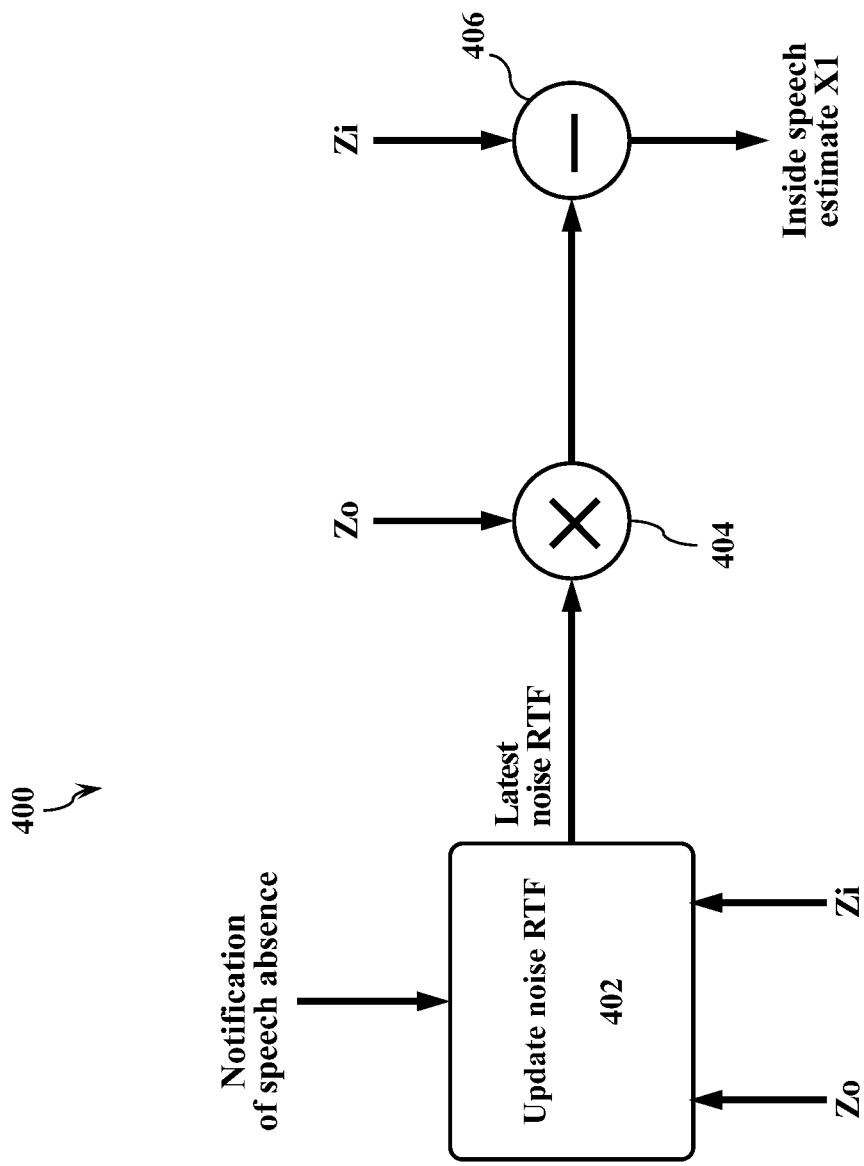
FIG. 4 illustrates an exemplary estimation of an inside speech signal, in accordance with one or more embodiments of the present disclosure.

Referring to FIG. 4, an embodiment of a method 400 for calculation of $X_1$ is illustrated. In step 402, the relative transfer function of the inside microphone is updated. The latest noise RTF is then applied to outside microphone signal (step 404) to estimate the noise which is subtracted from the inside microphone signal (step 406), resulting in the inside speech estimate, $X_1$. In noisy environments, tests show that $X_1$ provides a more comfortable signal to listen to (and more intelligible) than either the inside microphone signal, $Z_i$, or outside microphone signal, $Z_o$. However, $X_1$ may not be optimal (or have insufficient quality for certain embodiments) because of its "muffledness" compared to $X_o$—and this quality gap is more noticeable by a user in low noise situations. Various tests have shown that the approach described above is not optimal at higher frequencies where the noise becomes less and less coherent, and in practice $X_1$ approaches $Z_i$ at high frequencies.

To recover $X_o$ the system may also track $H_s$, which is articulation-dependent, and thus requires frequent updating and accuracy to be usable. Therefore, instead of calculating $X_1$ and then transforming it to obtain $X_o$ via the estimation of $H_s$ (or simply, instead of requiring the knowledge of $H_s$), in one embodiment a rough colored estimate for $X_o$ is obtained and its higher frequencies are mixed into the estimate for $X_i$. Let $X_2$ represent the colored estimate for $X_o$ and calculate it as follows:

$$X_2 = Z_o - H_{n,inv} Z_i$$

The inverse RTF $H_{n,inv}$ is calculated in the same way as $H_n$ during speech pauses, and also suffers from the same issue at higher frequencies, meaning that $X_2$ will approach $Z_o$ in the highest frequency bands.

One embodiment of updating $H_n$ and $H_{n,inv}$ includes to recursively averaging periodogram estimates for the expected variables in the following least-squares estimators:

$$\hat{H}_n = \frac{E(Z_i Z_o^*)}{E(|Z_o|^2)}$$

$$\hat{H}_{n,inv} = \frac{E(Z_o Z_i^*)}{E(|Z_i|^2)}$$

After $X_1$ and $X_2$ are available, the combination of low and high frequencies may be achieved by simple linear combination with:

$$X_3 = G_L X_1 + G_H X_2$$

where $G_L$ and $G_H$ are low and high-pass filters with tunable gains. The low-pass filter $G_L$ can also be configured to also equalize for the average low-frequency boosting that is caused by the occlusion. This equalization component can be calibrated from prior measurements.

An alternative to the estimation of $X_3$ is to estimate the speech in $Z_o$ by directly compensating the coloration in $X_1$ with an approximated scaling filter. The filter is computed in order to maximize the subband signal correlation between $X_1$ and $Z_o$ during speech activity.

$$X_3 = H_{speech} X_1$$

One embodiment of updating $H_{speech}$ includes recursively averaging periodogram estimates for the expected variables in the following least-squares estimator:

$$\hat{H}_{speech} = \frac{E(Z_o X_1^*)}{E(|X_1|^2)}$$

Figure 5:
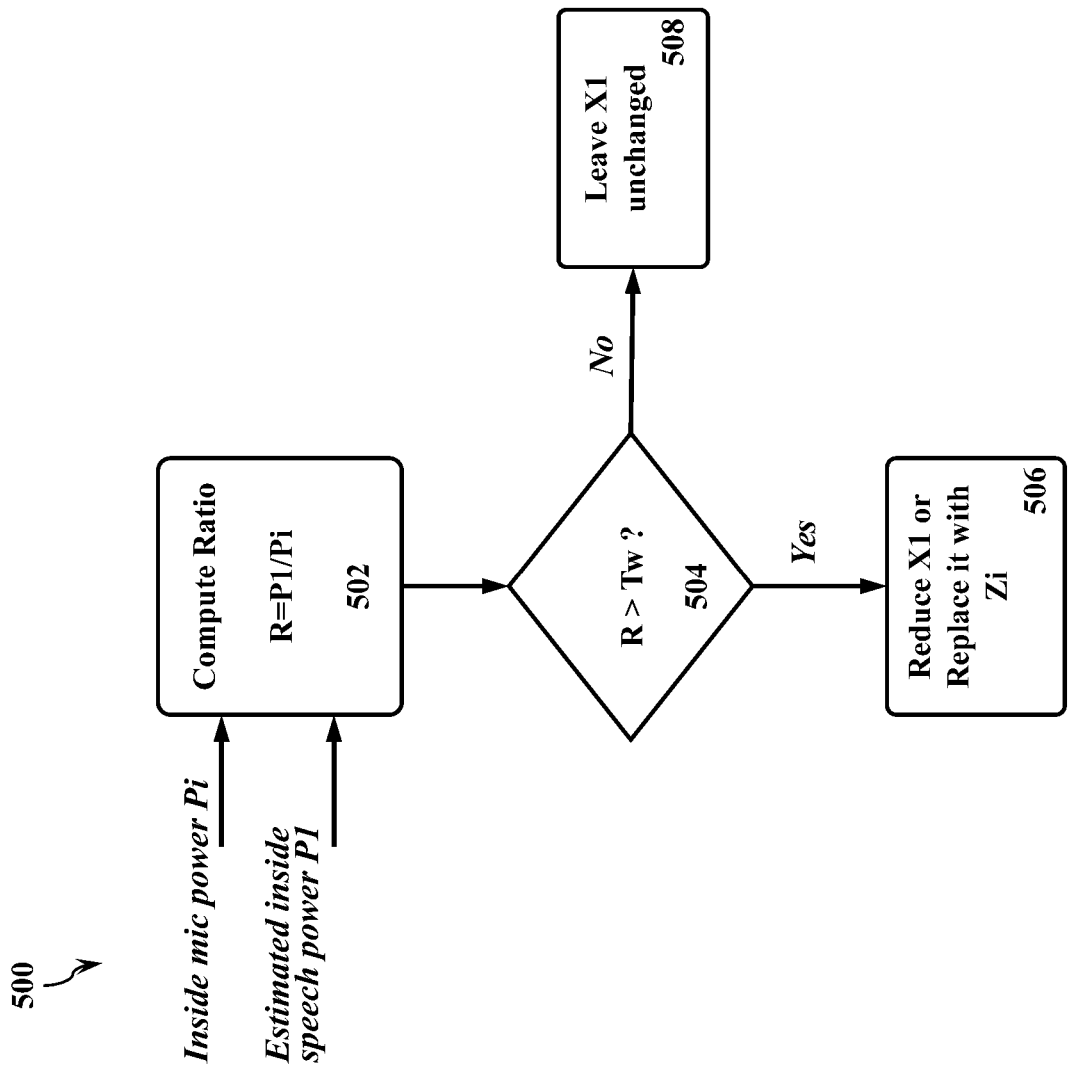
FIG. 5 illustrates wind noise mitigation, in accordance with one or more embodiments of the present disclosure.

Before moving on to the postfiltering stage (e.g., postfilter module 208 of FIG. 2), an optional step may be taken after the calculation of $X_1$ and before combining with $X_2$, to protect against wind noise. An embodiment of this wind-noise mitigation step is illustrated in FIG. 5. The optional step is based on the following:

$$E(|Z_i|^2) = E(|X_i|^2) + E(|N_i|^2) \geq E(|X_i|^2) \approx E(|X_1|^2)$$

In this step is assumed that the power of $X_1$ is less than the power at the unprocessed inside microphone. In the particular case of wind noise, there is an additional noise component with potentially very large-energy that appears in the lower subbands at the outside microphone. This wind noise is uncorrelated with the noise present at the inside microphone, meaning that (i) updates in the calculations for $H_n$ may be biased/erroneous and (ii) some of the wind noise may end up corrupting $X_1$. In practice, it is observed that (i) can be avoided with a VAD that can detect the wind noise as an additional independent source (i.e., $H_n$ is not likely to be updated during wind noise)—this is the case for an eigenvalue-based multichannel VAD. It remains that, in wind noise the equation above is often violated; indeed, even with a "perfect" estimate for $H_n$, an additional independent wind noise component appearing at the outside microphone with power $P_w$ has the following consequence on the power of $X_1$:

$$E(|X_1|^2) = E(|X_i|^2) + |H_n|^2 P_w \gg E(|X_i|^2),$$

and, if $P_w$ is sufficiently large, $E(|X_1|^2) \gg E(|Z_i|^2)$

As illustrated in the embodiment of FIG. 5, the method 500 tracks the squared magnitudes of $X_1$ and $Z_i$ (either instantaneously or with a recursive averaging technique using a small time-constant) and compares them. Denoting by $P_1$ the tracked power of $X_1$ and using again $P_i$ to denote the power tracked at the unprocessed inside microphone (although this particular instance of $P_i$ may be achieved with a different time-constant than in the VAD embodiment discussed above). The ratio, R, of $P_1$ to $P_i$ is calculated in step 502. In step 504, if R is greater than a wind noise threshold, $T_w$, which may be preselected, then $X_1$ is reduced in step 506. In one embodiment, $X_1$ is replaced with $Z_i$. In another embodiment, $X_1$ is reduced proportionally to the ratio $P_1/P_i$. If the ratio, R, is not greater than the wind threshold, $T_w$, then $X_1$ is left unchanged (step 508).

Postfilter

In real-world situations, the signals coming out of the first stage will likely contain residual noise due to both model and estimation inaccuracies. A postfiltering stage (see postfilter module 208, FIG. 2) functions to reduce that noise without undesirably hurting intelligibility. In one embodiment, this is achieved by masking noise-dominant time-frequency bins. One advantage of the postfilter of this embodiment over traditional single-channel solutions is that the voice activity detection can be performed using both microphones for higher accuracy, resulting in the potential for more accurate noise statistics. In fact, the noise statistics estimates can be updated fast during pauses, and slowly (or not at all) during speech with common techniques such as minimum statistics.

Different masking techniques may be used depending on whether the signal is to be presented to a human (e.g., for voice communications) or to a machine (e.g., for speech recognition). For instance, contrary to human listeners (for whom it is generally beneficial), certain ASR engines are very sensitive to smoothing. In one embodiment, the postfilter used for human listening has the following form:

$$G_{post} = \max\left\{VAD_{penalty} \times \min\left\{\frac{SNR}{SNR+1} + K, 1\right\}^\alpha, G_{min}\right\}$$

where $VAD_{penalty}$, K, $\alpha$ and $G_{min}$ are tuning constants. The factor $VAD_{penalty}$ can be used to further penalize (reduce) the gain in case the VAD is not detecting any speech.

By contrast, test results have shown that at most useful SNRs the best recognition can be achieved with the following filter directly applied to $Z_o$:

$$G_{ASR} = \left|\frac{X_1}{Z_i}\right|$$

One embodiment of computing the gain postfilter, $G_{post}$, includes estimation of the noise signal at the outside microphone $N_o$ computed as $$N_o = Z_o - X_3,$$

and a spectral gain function which depends on both $N_o$ and $X_3$ signals.

$$G_{post} = f(N_o, X_3)$$

As an example, the method disclosed in U.S. Patent Publication No. 2016/0029121, titled "SYSTEM AND METHOD FOR MULTICHANNEL ON-LINE UNSUPERVISED BAYESIAN SPECTRAL FILTERING OF REAL-WORLD ACOUSTIC NOISE," which is incorporated by reference herein in its entirety, can be adopted.

Transient Detection and Suppression

At the inside microphone (and not appearing in the model above) are internal body noises that are amplified by the occlusion. In particular, there is Eustachian tube popping/clicking during speech, jaw clicking, etc. These manifest themselves at the inside microphone as transient popping/clicking sounds that largely cover the whole frequency range. By contrast, the speech energy is mostly confined in the lower frequency range. Accordingly, a detection scheme in one embodiment includes focusing on the high frequencies of $Z_i$ (alternatively, $X_1$), locating significant peaks in the instantaneous energy and comparing these peaks to those immediately preceding/following it. This embodiment assumes that if a peak is isolated and strong enough, it is likely a non-speech body sound.

Figure 6:
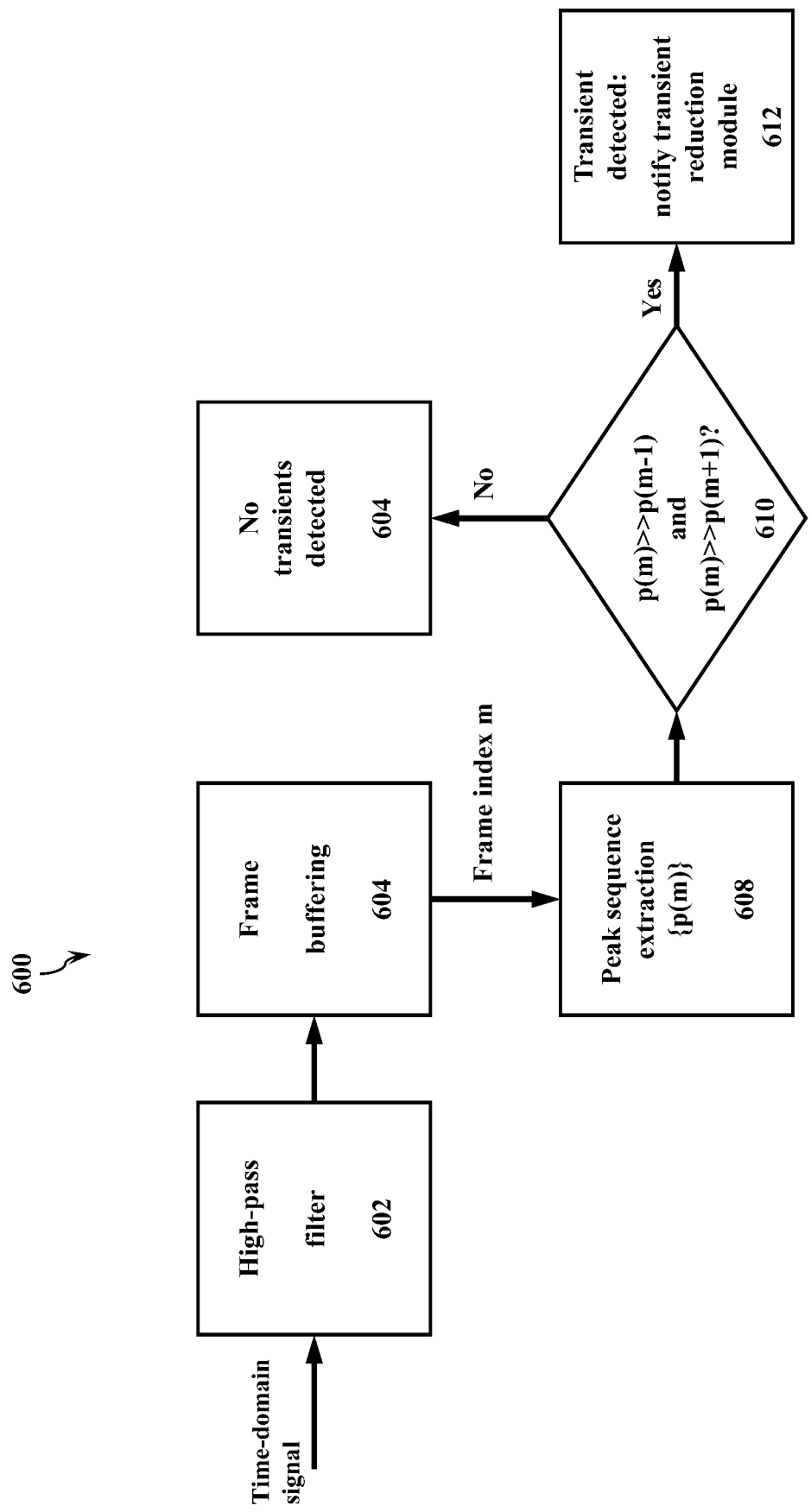
FIG. 6 illustrates transient noise detection, in accordance with one or more embodiment of the present disclosure.

An embodiment of a transient detection scheme 600 is illustrated in FIG. 6. A time-domain input signal, $Z_i$, is filtered through high-pass filter 602 to isolate the high frequencies. The filtered input signal is divided into a sequence of frames having an index m at frame buffer 604. Spectral peaks for each frame are identified in peak sequence extraction module 608. In step 610, a determination of whether a frame m includes transient noise is made. In the illustrated embodiment, a transient is detected in frame m if the magnitude of peak sequence p(m) is much greater than the magnitude of peak sequence p(m−1) and the magnitude of peak sequence p(m) is much greater than the magnitude of peak sequence p(m+1). In various embodiments, the detection may use a threshold value for identifying transients. Otherwise, no transients are detected (step 606).

Figure 7:
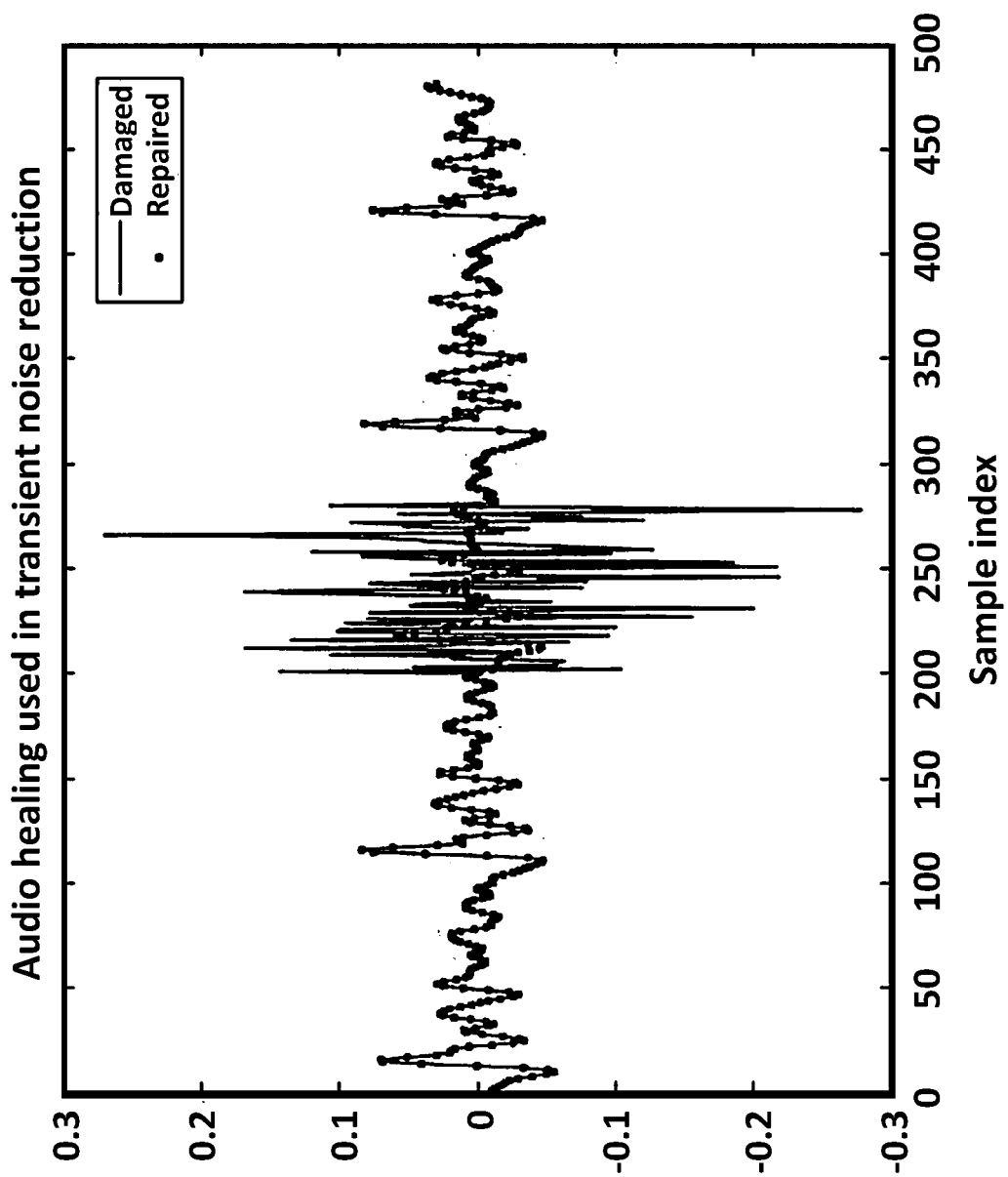
FIG. 7 illustrates transient noise reduction on an exemplary audio signal, in accordance with one or more embodiments of the present disclosure.

Once a transient is found, it may be concealed, for example, by using known transient reduction techniques, such as may be implemented in a transient reduction module (step 612). In one embodiment, the transient is concealed by locating in the signal history a segment that substantially matches the one just preceding the transient and then replacing the transient with the audio signal just following the historical match. The system may also cross fade the boundaries of the replacement frame. This technique is found to work well, particularly if the transient occurs in a relatively stationary segment and if the transient, such as clicking, is well localized. FIG. 7 illustrates an example of audio healing used in transient noise reduction on an input audio signal.

An embodiment of transient noise reduction works in the subband domain, by replacing $X_3$ with the minimum value between $|X_3|$ and $|Z_o|$ as $$X_3 = \min(|X_3|, |Z_o|) * (X_3/|X_3|)$$

As the $X_3$ is obtained by $Z_i$, it might contain body noise which is not included in $Z_o$. Note, $X_3$ is the speech estimate in $Z_o$ and so it should be smaller than $Z_o$ in magnitude. Therefore, any noise which is not included in the external microphone $Z_o$, will be consequently attenuated.

Postprocessing

The (postfiltered and "transient-repaired" version of the) time-domain signal $x_3(t)$ (which is the synthesized version of $X_3$) contains significantly less noise than either $z_i(t)$ or $z_o(t)$, even at very low SNRs. However, for many human listening applications it is desirable to balance these noise reduction and intelligibility improvement benefits with the distortion that is introduced. At very high SNRs for instance, for human listening it may be preferred to leave the signal intact, or to merely use a single-channel filtered version of $z_o(t)$. To avoid this unnecessary distortion, the present embodiment includes linearly combining the $x_3(t)$ and $z_o(t)$ (or a filtered version of it), with the weights leaning more towards $z_o(t)$ at high SNR, and more towards $x_3(t)$ at low SNR. It may even be desired to add a small portion of $z_o(t)$ into $x_3(t)$ to preserve a certain degree of naturalness throughout. This approach also helps cover up transient concealment artifacts that may be present.

In one embodiment, the output "final" signal $x_f(t)$ is written as:

$$x_f(t) = A_{SNR(t)} x_3(t) + (1 - A_{SNR(t)}) z_o(t)$$

where the weight $A_{SNR(t)}$ is a function of the estimated SNR. The SNR is estimated using the VAD decision (described in above). During speech absence, an average value for the noise power is updated by one pole smoothing, and in speech presence, an average value for the noisy power is updated. The SNR is deduced as the ratio of the noisy power over the noise power minus 1.

To achieve a satisfactory-sounding output signal for many applications, we let the weight $A_{SNR(t)}$ evolve slowly in time to avoid abrupt changes in signal coloration (this can be achieved for instance by slowly updating the SNR, or by recursively averaging directly $A_{SNR(t)}$). The SNR is estimated with the help of the VAD.

In one embodiment, the smoothed log-domain SNR maps linearly to $A_{SNR(t)}$ where: $A_{SNR(t)}$ has a minimum value greater or equal to zero, and a maximum value lesser or equal to one; and the slope between this minimum and maximum value is determined by SNR thresholds set a priori.

Figure 8:
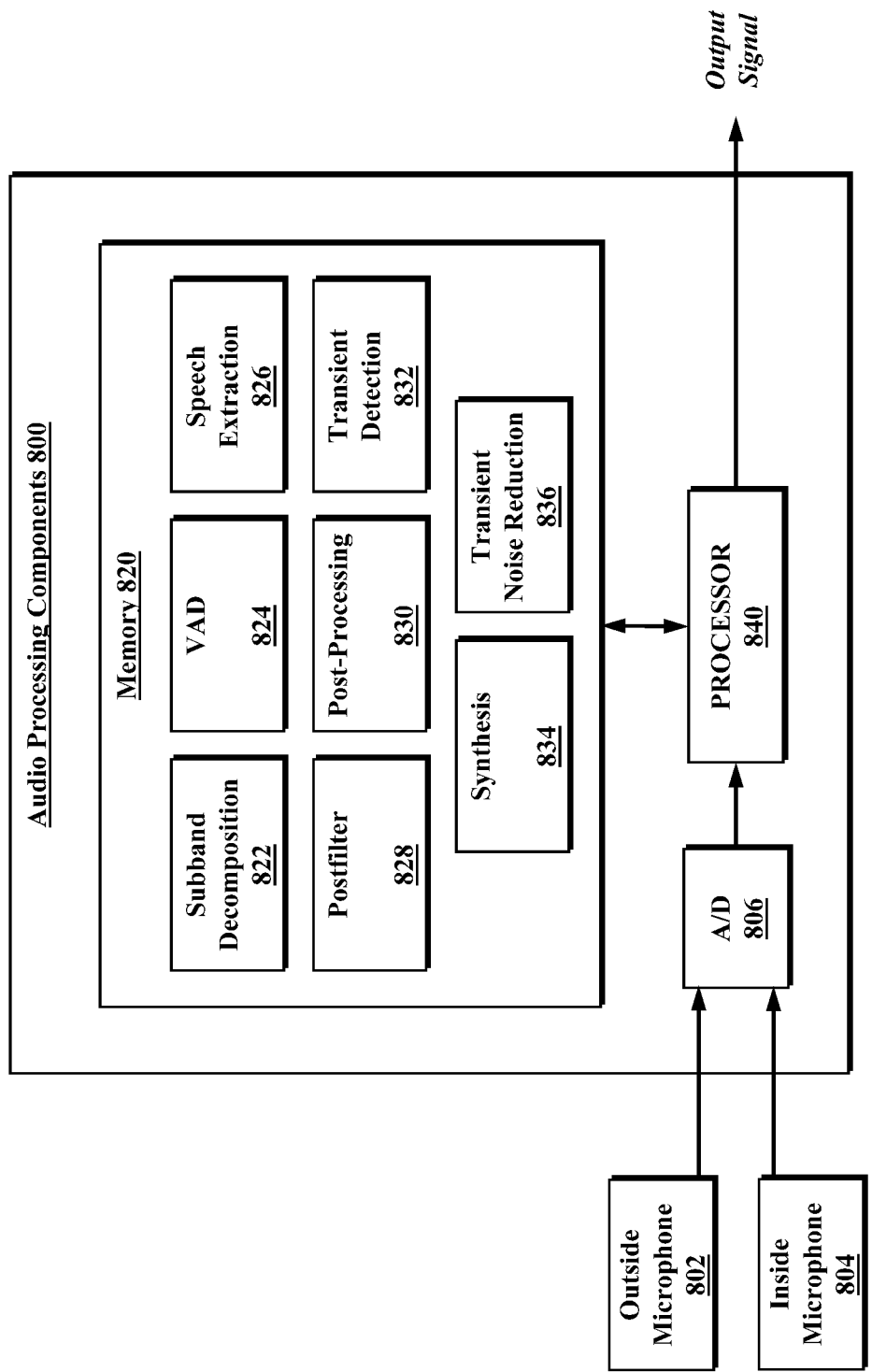
FIG. 8 illustrates audio input processing components in accordance with one or more embodiments of the present disclosure.

FIG. 8 is a diagram of audio processing components 800 for processing two-channel audio input data in accordance with an exemplary implementation of the present disclosure. Audio processing components 800 generally correspond to the architecture of FIG. 2, and may share any of the functionality previously described herein. Audio processing components 800 can be implemented in hardware or as a combination of hardware and software, and can be configured for operation on a digital signal processor, a general purpose computer, or other suitable platform.

As shown in FIG. 8, audio processing components 800 include memory 820 and a processor 840. In addition, audio processing components 800 include a subband decomposition module 822, voice activity detector module 824, speech extraction module 826, postfilter module 828, post-processing module 830, transient noise detection module 832, synthesis module 834 and transient noise reduction module 836, some or all of which may be stored as executable program instructions in the memory 820. Also shown in FIG. 8 are headset microphones, outside microphone input 802 and an inside microphone input 804, which are communicative coupled to the audio processing components in a physical (e.g., hardwire) or wireless (e.g., Bluetooth) manner. An analog to digital converter 806 is configured to receive the audio inputs and provide the audio signals to the processor 840 for processing as described herein.

In some embodiments, processor 840 may execute machine readable instructions (e.g., software, firmware, or other instructions) stored in memory 820. In this regard, processor 840 may perform any of the various operations, processes, and techniques described herein. In other embodiments, processor 840 may be replaced and/or supplemented with dedicated hardware components to perform any desired combination of the various techniques described herein. Memory 820 may be implemented as a machine readable medium storing various machine readable instructions and data. For example, in some embodiments, memory 820 may store an operating system, and one or more applications as machine readable instructions that may be read and executed by processor 840 to perform the various techniques described herein. In some embodiments, memory 820 may be implemented as non-volatile memory (e.g., flash memory, hard drive, solid state drive, or other non-transitory machine readable mediums), volatile memory, or combinations thereof.

In various embodiments, the audio processing components 800 are implemented within a user device, such as a smartphone, tablet, mobile computer, appliance or other device that processes audio data through a headset. In operation, the audio processing components 800 produce an output signal that may be stored in memory, used by other device applications or components, or transmitted to for use by another device.

It should be apparent that the foregoing disclosure has many advantages over the prior art. The solutions disclosed herein are less expensive to implement than conventional solutions, and do not require precise prior training/calibration, nor the availability of a specific activity-detection sensor. Provided there is room for a second inside microphone, it also has the advantage of being compatible with, and easy to integrate into, existing headsets. Convention solutions require pre-training, are computationally complex, and the results shown are not acceptable for many human listening environments.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for enhancing a headset user's own voice comprising:
   receiving a plurality of time-domain microphone signals from the headset, including an outside microphone signal from an external microphone configured to sense audio signals outside of the headset, and an inside microphone signal from an inside microphone configured to sense signals on the inside of the headset;
   transforming the time-domain microphone signals to frequency domain subband signals;

detecting speech presence and absence in the subband signals;

predicting a clean speech signal in each of the inside microphone signal and outside microphone signal through an adaptive multichannel linear filter estimation process;

cancelling audio sources other than the headset user's own voice by combining the predicted clean speech signal from the inside microphone signal and the predicted clean speech signal from the outside microphone signal; and reducing residual noise through a postfiltering process.

2. The method of claim 1 wherein the inside microphone is positioned inside the headset user's ear canal during operation, and further configured to sense an occlusion effect.

3. The method of claim 1 further comprising limiting distortion introduced in the cancelling and reducing steps.

4. The method of claim 1 further comprising transforming the subband signals into time domain output signals through a subband synthesis process.

5. The method of claim 4 further comprising reducing body-sound-induced transient noise from the time domain output signals.

6. The method of claim 1 wherein cancelling audio sources further comprises linearly combining lower frequency bands of the predicted clean speech signal from the inside microphone signal with higher frequency bands of the predicted clean speech signal from the outside speech signal.

7. The method of claim 6 wherein linearly combining further comprises updating weights of the linearly combined speech signals during detected speech absences.

8. The method of claim 7 wherein the weights of the linearly combined speech signals are calculated to model a relative transfer function of noise signal contributions between the inside and outside microphones.

9. The method of claim 1 further comprising reducing wind noise by replacing lower frequency bands of the estimated inside microphone clean speech with lower frequency bands of the received inside microphone signal.

10. The method of claim 1 further comprising reducing wind noise by reducing lower frequency bands of the predicted clean speech signal from the inside microphone signal.

11. The method of claim 10 wherein reducing the lower frequency bands of the predicted clean speech signal from the inside microphone signal is performed only when a measured power of the predicted clean speech signal from the inside microphone signal is significantly larger than a measured power of the received inside microphone signal.

12. The method of claim 1 wherein the postfiltering process comprises a real-valued gain reduction.

13. The method of claim 1 wherein the postfiltering process comprises adding a fraction of one noisy outside microphone signal to a generated postfiltered signal.

14. The method of claim 13 wherein the fraction of one noisy outside microphone signal is calculated based on a measure of a Signal-to-Noise Ratio.

15. A system comprising:
an outside microphone configured to sense audio external to a headset;
an inside microphone configured to sense audio internal to the headset;
audio input components configured to receive a plurality of time-domain microphone signals, including an outside microphone signal from the outside microphone and an inside microphone signal from the inside microphone;
a subband decomposition module configured to transform the time-domain microphone signals to frequency domain subband signals;
a voice activity detector configured to detect speech presence and absence in the subband signals;
a speech extraction module configured to predict a clean speech signal in each of the inside microphone signal and the outside microphone signal, and cancel audio sources other than a headset user's own voice by combining the predicted clean speech signal from the inside microphone signal and the predicted clean speech signal from the outside microphone signal; and
a postfiltering module operable to reduce residual noise and output an enhanced speech signal comprising the headset user's own voice.

16. The system of claim 15 further comprising:
a time-domain synthesis module operable to transform the subband signals into time domain output signals through a subband synthesis process; and
a transient noise reduction module operable to reduce body-sound-induced transient noise from the time-domain output signals.

17. The system of claim 15 wherein the speech extraction module is further configured to predict clean speech in each of the inside microphone signal and outside microphone signal through an adaptive multichannel linear filter estimation process utilizing recursive averaging estimates; and wherein the speech extraction module is further configured to linearly combine lower frequency bands of the predicted clean speech signal from the inside microphone signal with higher frequency bands of the predicted clean speech signal from the outside speech signal.

18. The system of claim 17 wherein the speech extraction module is further operable to update weights of linearly combined speech signals during detected speech absences.

19. The system of claim 17 wherein the speech extraction module is further operable to calculate weights of linearly combined speech signals to model a relative transfer function of noise signal contributions between the inside microphone and the outside microphone.

20. The system of claim 15 further comprising a wind noise reduction module operable to replace lower frequency bands of the predicted clean speech signal from the inside microphone with higher frequency bands of the predicted clean speech signal from the received outside microphone signal.

* * * * *